UNITED STATES PATENT OFFICE.

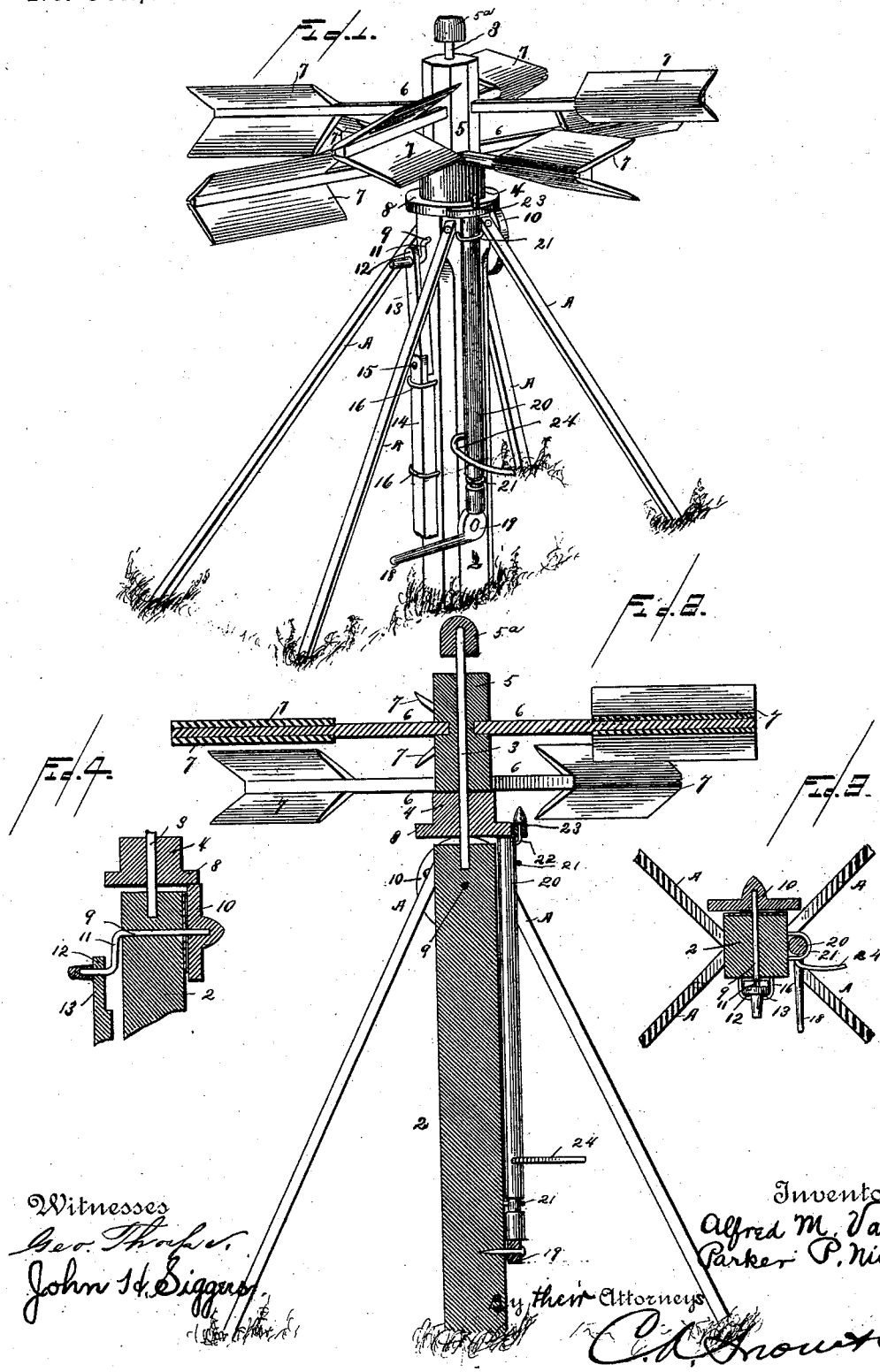

ALFRED M. VANPELT AND PARKER P. NICHOLLS, OF SENECA, KANSAS.

WINDMILL.

SPECIFICATION forming part of Letters Patent No. 362,557, dated May 10, 1887.

Application filed September 7, 1886. Serial No. 212,919. (No model.)

*To all whom it may concern:*

Be it known that we, ALFRED M. VANPELT and PARKER P. NICHOLLS, citizens of the United States, residing at Seneca, in the county of Nemaha and State of Kansas, have invented new and useful Improvements in Windmills, of which the following is a specification.

Our invention relates to improvements in windmills; and it consists of the details of construction, combination, arrangement, and adaptation of its parts for service, substantially as hereinafter set forth, and specifically pointed out in the claim appended.

The object of our invention is the provision of a windmill which will overcome the objections found to exist in windmills heretofore constructed, to produce an improved form of wheel, and also novel and efficient driving mechanism; furthermore, to provide an improved device for preventing the turning or revolving of the wheel when the mill is thrown out of operation.

A further object of our invention is to simplify and strengthen the construction, and produce a windmill which will be thoroughly efficient in operation and inexpensive to manufacture.

In order that our invention may be fully understood and the advantages gained by our improvements appreciated, we have illustrated a windmill constructed in accordance with and embodying our invention in the accompanying drawings, in which—

Figure 1 is a perspective view of our improved windmill in operative position; and Fig. 2 is a vertical longitudinal sectional view, the wind-wheel being illustrated as out of contact with the operating or driving mechanism. Fig. 3 is a horizontal section through the tower. Fig. 4 is a detached vertical section.

Referring to the drawings, in which like numerals of reference denote corresponding parts in all the figures, 2 designates a vertical upright or standard, which provides the tower of our improved windmill, and is supported in an upright position and prevented from being blown down by the stay-rods or retaining-bars A, four in number, which are secured at the lower end to the ground or a suitable base or platform by staples or like means, and at their upper ends fitted to eyes or staples provided near the top of the upright or tower.

In the upper end of the upright or tower 2 is fixed a rod, 3, which extends upwardly therefrom and provides a spindle or pivot for the rotary disk 4 and the wind-wheel hub 5 to revolve upon. The said wind-wheel hub 5 has affixed to it two sets of radial arms, 6, four in each set, and arranged one set above the other, with the arms or spokes of one set out of line with the other set. The free ends of the said radial arms or spokes have wings or blades 7, which are constructed in the shape of an acute angle or similar to the letter V.

The wind-wheel hub 5 rests on and is firmly secured to the rotary disk 4, being held from moving off the pivot or spindle by the cap $5^a$ on the upper end of the spindle 3. The said rotary disk is of a circular form, and is larger in circumference at its lower end, so as to provide a flange, as at 8, for the purpose to be presently explained.

Passing transversely through the upper portion of the upright or tower 2, and revolving in suitable bearings therein, is a shaft, 9, which shaft is extended beyond the upright or tower at both ends, and has secured to one end a friction or driving wheel, 10, which, when in operative position, bears against the under side of the enlarged circular portion or flange 8 of the rotary disk 4. The other end of the said shaft 9 is formed with a crank, 11, to which is attached one end of the plunger-rod 12. This plunger-rod is formed in two sections, 13 and 14, pivoted together at 15, as plainly shown, the section 14 moving vertically in guides 16, rigidly affixed to the upright or tower 2, and passing down to a convenient point above the ground and connecting with the machinery to be driven.

To the lower end of the upright or tower 2, on one side, is pivoted a lever, 18, having a cam or eccentric, 19, at one end, which cam or eccentric is adapted to press or bear against the lower end of a vertical rod or bar, 20, moving vertically in suitable guides, 21, secured to the upright or tower. The upper end of this rod 20 lies under the enlarged circular portion or flange 8 of the rotary disk, so that when the cam 19 on the lever 18 is turned the upper end of the rod is elevated, and thereby lifts the rotary disk from off the friction or driving wheel 10.

Secured to the upper end of the rod 20, and projecting at right angles therefrom, is an arm, 22, to which arm is affixed a block or brake-shoe, 23, that is adapted, by reason of the arm 24, secured to the vertical rod 20, to be pressed against the periphery of the enlarged circular portion or flange 8 of the turntable to retard the movement of the said turntable and the consequent movement of the wind-wheel.

This being the construction of our windmill, the operation of the same is as follows: The wind striking against the wings or blades of the wheel causes it to revolve, carrying with it the rotary disk, which, by reason of its enlarged circular portion or flange resting on the friction or driving wheel 10, revolves the said wheel, the latter rotating the shaft carrying the plunger which connects with the driving mechanism.

It will be readily understood that the weight of the wind-wheel is sufficient to cause perfect frictional contact between the rotary disk and the friction or driving wheel 10, so that the said wheel 10 will always be revolved by the motion of the wind-wheel to operate the connected mechanism. It will also be observed that we provide improved means for throwing the mechanism out of operation by simply raising the lever carrying the cam or eccentric, pushing the rod upward, and elevating the rotary disk from off the driving-wheel 10 and effectually retaining it from contact therewith.

The speed of the wind-wheel can be regulated by operating the rod 24, causing the rod 20 to be rotated and the shoe or block to oscillate to one side and press against the periphery of the enlarged circular portion or flange 8 of the rotary disk. It will also be seen that by reason of the peculiar shape and arrangement of the wings or blades they are adapted to catch the wind and cause the ready and easy turning of the wheel.

From the foregoing description, taken in connection with the drawings, it will be observed that we provide a windmill which by reason of its few parts is very simple, strong, and durable in construction, is not likely to be blown down by heavy winds or get out of order, and can be manufactured at such a low figure as to be placed within the reach of all farmers and others who desire a practical windmill.

We do not wish to be understood as limiting ourselves to the precise construction, arrangement, and proportion of the parts herein shown and described, as many changes may be made therein without departing from the spirit or scope of our invention.

We claim—

The combination of the tower, the spindle supported in the upper end thereof, the rotary disk fitted on the spindle and actuated by the wheel, a transverse shaft below the said disk, a friction-wheel on said shaft upon which the rotary disk impinges, and a vertically-movable oscillating rod held to the tower and arranged to bear against the under side of the disk to elevate it from the friction-roller, and carrying a brake-shoe adapted to bear against the periphery of the disk, substantially as described.

In testimony that we claim the foregoing as our own we have hereto affixed our signatures in presence of two witnesses.

ALFRED M. VANPELT.
PARKER P. NICHOLLS.

Witnesses:
O. H. STILSON,
N. FORDYCE.